United States Patent [19]

Truninger

[11] Patent Number: 4,671,401

[45] Date of Patent: Jun. 9, 1987

[54] METHOD OF AND APPARATUS FOR CONVEYING ARTICLES

[76] Inventor: Paul Truninger, Industriestr. 9, 4513 Langendorf, Switzerland

[21] Appl. No.: 810,077

[22] Filed: Dec. 17, 1985

[30] Foreign Application Priority Data

Dec. 21, 1984 [EP] European Pat. Off. ........ 84116053.4

[51] Int. Cl.$^4$ ............................................. B65G 47/26
[52] U.S. Cl. .................................. 198/427; 198/430; 198/468.6; 198/580
[58] Field of Search ............... 198/341, 427, 429, 430, 198/436, 468.6, 580

[56] References Cited

U.S. PATENT DOCUMENTS

| | | | |
|---|---|---|---|
| 3,327,453 | 6/1967 | Willbrandt et al. | 198/468.6 |
| 3,570,647 | 3/1971 | Meikle et al. | 198/468.6 |
| 4,029,215 | 6/1977 | Birdwell | 198/468.6 |
| 4,227,847 | 10/1980 | Bossetti | 198/429 |
| 4,306,646 | 12/1981 | Magni | 198/341 |

FOREIGN PATENT DOCUMENTS 1159328 12/1963 Fed. Rep. of Germany .

Primary Examiner—Joseph E. Valenza
Attorney, Agent, or Firm—Henry M. Feiereisen

[57] ABSTRACT

A method and an apparatus for conveying articles from at least one magazine to several depositing areas includes a continuous, endless conveyor by which the articles are transported from the magazine to predetermined positions which extends on the conveyor below the depositing areas at equal distance b to each other. The number of positions corresponds to the number of depositing areas. Moreover lifting units are provided of a number corresponding to the number of predetermined positions for transporting the articles from the positions to the depositing areas. The conveyor is moved step-by-step at a step length $s = b/(n-1)$ wherein b is the distance between two adjacent positions and n is the number of positions or the number of steps. The magazine has a distance $a = s \cdot x$ from the one position closest in conveying direction wherein x is an integer.

18 Claims, 6 Drawing Figures

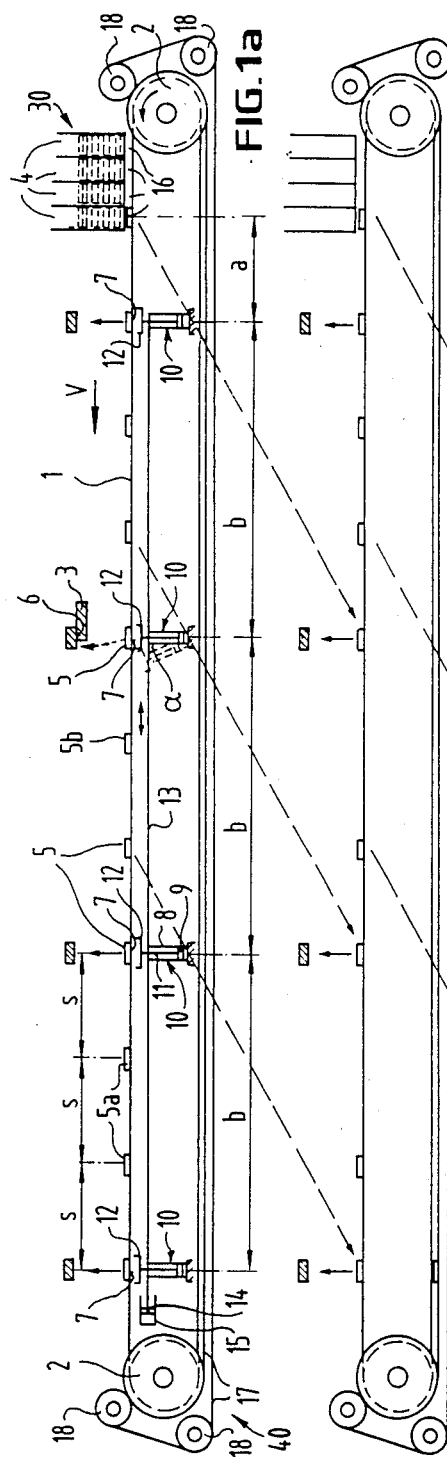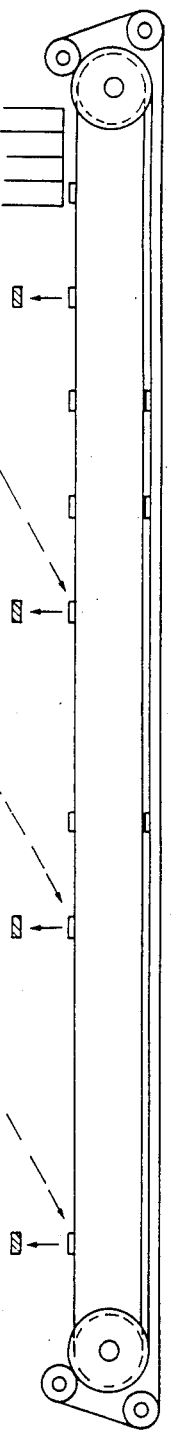
FIG.1a
FIG.1b
FIG.1c
FIG.1d

METHOD OF AND APPARATUS FOR CONVEYING ARTICLES

BACKGROUND OF THE INVENTION

The present invention refers to a method of and apparatus for conveying articles, especially intermediate layers from a magazine to a transport unit for elongated articles.

It is one object of the present invention to provide a method of and an apparatus for continuously conveying articles from a magazine to several depositing areas without requiring any interruption of the operation when recharging the magazine.

This object is realized by providing a conveyor cooperating with at least one magazine which contains the articles and releases the latter onto the conveyor at a loading area for transporting the articles in conveying direction from the loading area to a plurality of predetermined positions wherein the conveyor is advanced step-by-step at a step length $s=b/(n-1)$ in which b is the distance between two adjacent positions and n is the number of positions. The articles are transported by respective lifting units which are arranged at each of the predetermined positions. The number of lifting units and thus of predetermined positions corresponds to the number of depositing areas.

Each lifting unit for the associated predetermined position includes a cylinder-piston arrangement whose piston rod supports an engaging member which during the upward displacement of the piston lifts the article from the position and deposits it onto the depositing area defined by a respective transfer arm of a transport unit. To allow each engaging member to move past the aligned transfer arm, all cylinders of the lifting units are commonly connected to a horizontal rod which is movable in horizontal direction to tilt the cylinders to one side.

Preferably, the conveyor is a conveying chain whose links are open to allow the engaging members to pass therethrough when moving up and downwardly. Each link is provided with a pocket to receive one article released from the magazine.

Aside from the uncomplicated mechanical structure for supplying the conveying chain with articles, there is the advantage that no complicated control mechanism is necessary for the supply of articles and no logic is required for reintroducing returned excess intermediate layers or articles obtained during the initial stage of the process or in case not all articles are lifted from their respective position e.g. in case of intermediate layers for elongated articles of short length. Without any additional expenditures, it is also achieved that a plurality of magazines is completely emptied even if not all lifting units are actuated.

Through the step-by-step movement of the conveyor, the articles can accurately be positioned on the conveyor and transported to the lifting units because the conveyor is not moved when the articles drop from the magazines and lifted therefrom. Through determining the step length in accordance with the invention, the acceleration of the conveyor during the transport of the articles is kept to a minimum but is still sufficient to guarantee the transport of the articles to the lifting units in a relatively short period. In a typical conveying apparatus, the available time is e.g. 10 seconds for 9 articles which are arranged over a length of 8 m.

The apparatus according to the invention does not require a complicated control mechanism and is reliable in operation. Since the magazines are laterally arranged next to the depositing areas i.e. transfer arms, free access to the magazines is provided so that an easy recharging without requiring to shut down the transport apparatus is provided.

The method and the apparatus are suitable for any kind of article but especially for the supply of intermediate layers to a transport unit for elongated articles. In addition, it should be noted that the apparatus can certainly be used in a reverse cycle which means to pick up articles from the depositing areas and to convey them to one or several magazines.

BRIEF DESCRIPTION OF THE DRAWING

The above and other objects, features and advantages of the present invention will now be described in more detail with reference to the accompanying drawing in which:

FIGS. 1a to 1d show in schematic illustration one embodiment of an apparatus according to the invention during successive stages of the process for preparing a first, second, third and fourth layer of articles;

SPECIFIC DESCRIPTION

Figure 3:
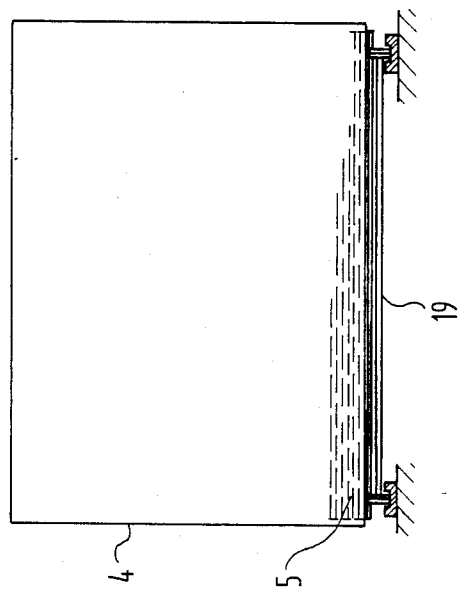
FIG. 3 is a schematic view of the container along a line transverse to the conveying direction of the apparatus according to the invention.
Figure 2:
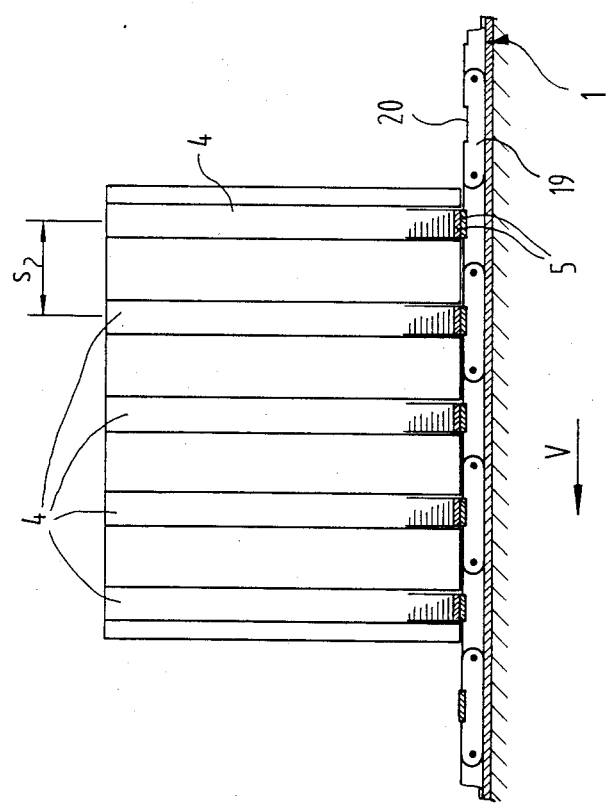
FIG. 2 is a schematic side view of a container provided with a plurality of magazines accommodating the articles.

In FIGS. 1a to 1d, the apparatus according to the invention is shown during four consecutive stages of the process to allow four layers of articles to be carried away. The apparatus includes an endless conveyor 1 which runs continuously in conveying direction V about two spaced pulleys 2 to transport articles 5, e.g. intermediate layers. The conveyor 1 may be provided in form of a conveyor chain as shown in FIG. 2 or in form of a conveyor belt and is driven by a stepper motor which is not shown in detail but is of any suitable type to move the conveyor 1 stepwise in direction V. Uniformly spaced along the upper run of the conveyor 1 at a distance thereto are a plurality of transport arms 3 (only one transport arm 3 is shown in FIG. 1a) which are part of a not shown transport unit arranged adjacent to the conveyor 1. The transport arms 3 transfer the articles 5 from the conveyor 1 to another location where the articles are stacked in a suitable manner e.g. in a container. In this connection reference is made to the U.S. patent application Ser. No. 632,410 which is commonly owned and illustrates transport arms transferring articles from a conveyor to a stacking station.

The conveyor 1 runs below the transport arms 3 and extends beyond the first transport arm 3 at the right hand side of FIG. 1a to cooperate with a container generally designated by reference numeral 30 and accommodating a plurality of vertical box-shaped magazines 4 arranged successively in conveying direction V. Stacked horizontally within each magazine 4 are articles 5 which are placed onto the conveyor 1 to be transported in direction V. In the present example, the articles 5 are of elongated shape but the present invention should not be limited to such shaped articles as any other shape may also be possible. The apparatus is also suitable to transport intermediate layers which are then transferred by the arms 3 to be positioned between two stacked articles and may be of paperboard, plastic material or any other flat material.

Arranged at the low end of each magazine 4 is a not shown dispensing unit of any suitable design and type which allows the articles 5 to drop individually under the influence of gravity onto the subjacent conveyor 1. The loading areas on the conveyor 1 for the articles 5 is indicated in FIG. 1a by reference numeral 16. The magazines 4 have each an open top to allow recharging of articles 5 during operation of the apparatus.

As can be seen from FIG. 1a, the one magazine 4 closest to the transport arms 3 has a distance a therefrom which is an integral multiple of the step length s by which the conveyor 1 is advanced through the stepper motor. This certainly means that the same distance a is provided between the forward loading area 16 and the adjacent position 7 in conveying direction V. The distance a is dependent on the step length s according to the formula $a = s \cdot x$ in which x is an integer.

Although the drawing shows the use of several magazines 4, it is certainly possible to use only one single magazine; however, for economical reasons, it is preferred to use several magazines to facilitate the recharging with articles 5. In FIG. 2, a container 30 with five magazines 4 is shown which are spaced from each other at a distance equal to the step length s by which the conveyor 1 is advanced. By distancing the magazines 4 in this manner, the latter can be emptied successively without necessitating to shift the magazines 4 in conveying direction V when one magazine is empty or to modify the step length s.

In FIG. 1a, the container 30 is only shown schematically with its four magazines 4 not spaced from each other by the step length s; however, it should be pointed out that the container as shown in FIG. 2 illustrates the preferred embodiment for the apparatus according to the invention.

Associated to each transport arm 3 is a lifting unit generally designated by reference numeral 10 and extending below the conveyor 1. The lifting unit 10 includes a piston 9 reciprocating within a cylinder 8 which extends perpendicular to the conveyor 1. The piston 9 is actuated by a pressure medium and is connected to one end of a piston rod 11 whose other end facing the conveyor 1 supports a U-shaped engaging member 12 with an open top. For reasons of clarity, the inlet and outlet lines for the pressure medium to the cylinders 8 are not shown in detail. By means of the lifting units 10, the articles 5 are lifted in a manner still to be described hereinbelow from their respective position 7 on the conveyor 1 and deposited onto the upper surface 6 of the transport arms 3.

The upper end of each cylinder 8 is connected to a common horizontal rod 13 which extends parallel to the conveyor 1 and is connected to a piston 14 reciprocating in a cylinder 15 so that the cylinders 8 are simultaneously tilted about a respective pivot at the lower end of each cylinder 8. As indicated in FIG. 1a with dash-dotted lines, each cylinder 8 tilts at an angle α about the associated pivot. The displacement of the piston 14 within the cylinder 15 is provided by a pressure medium supplied to and discharged from the cylinder 15 via not shown inlet and outlet lines.

When the articles 5 are advanced step-by-step by the conveyor 1 in direction V until each position 7 is occupied with an article 5, the engaging members 12 are moved by the lifting units 10 upwardly to pick up the articles 5 and then, the cylinders 8 are tilted to the side by the horizontal rod 13 displaced to the left in FIG. 1a by the piston 14 so that the engaging members 12 follow a path laterally past the transport arms 3. During retraction of the engaging members 12, the articles 5 are placed automatically onto the depositing areas 6 of the transport arms 3. In orer to allow the engaging members 12 to move upwardly towards the transport arms 3, the conveyor 1 is provided with adjoining openings (not shown) through which the engaging members 12 travel when the articles 5 are to be transported. In order to allow the engaging members 12 to be retracted, the transport arms 3 are provided with lateral recesses (not shown) to provide clearance for the engaging members 12.

As is shown in FIG. 1a, each lifting unit 10 defines in its vertical position an axis which coincides with a vertical line extending through the engaging member 12, position 7 and depositing area 6.

Evidently, the number of lifting units 10 corresponds to the number of transport arms 3 as well as to the number of positions 7 above the engaging members 12. As already mentioned, the transport arms 3 are uniformly spaced from each other which means that the lifting units 10 and the positions 7 have the same distance to each other as indicated by reference character b in FIG. 1a. In the embodiment shown in the FIGS. 1a to 1d, four positions 7 are provided so that equally four lifting units 10 and four transport arms 3 are arranged.

As already described, the conveyor 1 is advanced by the stepper motor by a step length s which is determined in accordance to the formula $s = b/(n-1)$ in which b is the distance between two adjacent positions 7 (or lifting units 10) and n is the number of positions 7 (or lifting units 10 or transport arms 3).

The mode of operation of the apparatus is as follows:
Between two succeeding steps during which the conveyor 1 is stopped, an article 5 drops from a respective one of the magazines 4 onto the conveyor 1 at the respective loading area 16. The articles 5 are then advanced stepwise in conveying direction V to the positions 7 above the engaging members 12. For providing an article 5 at each position 7, the conveyor 1 must thus be advanced by $(n-1)^2 + x$ steps wherein n is the number of positions 7 and x is an integer. This means for the embodiment as shown in FIG. 1a that $(4-1)^2 + 1 = 10$ steps are necessary since $x = 1$ if $a = s$ in accordance with the formula $a = s \cdot x$ or $x = a/s$, *and that a total of eleven articles 5 are arranged on the conveyor when—during the initial stage of the process—the positions 7 are occupied for the first time with articles 5. This stage is shown in FIG. 1a.*

At this point, the lifting units 10 are actuated to transport the articles 5 with the respective engaging members 12 to the associated transport arms 3 in cooperation with the piston-cylinder unit 14,15. Once the lifting units 10 are retracted, the conveyor 1 is advanced by n steps (n being the number of positions 7) in order to provide again one article 5 at each position 7 (FIG. 1b). During the advance of the conveyor 1 by n steps, the transport arms 3 transfer the articles 5 previously deposited thereon during retraction of the engaging members 12 to a respective location and return to their position above the conveyor 1 to receive the next layer of articles.

As shown in FIG. 1b, when the conveyor 1 is advanced by n steps to provide a second layer of articles 5 at the respective positions 7, two articles 5a (only one can be seen in FIG. 1b) will be transported beyond the last position 7 in conveying direction V so that they are not picked up by the respective lifting units 10 at this stage. As will be described further below, these excess articles are collected or reintroduced into the process at a later stage.

Once each position 7 is occupied by one article 5, the lifting unit 10 is actuated again to transport the second layer of articles to the transport arms 3. Thereafter, the conveyor 1 is advanced by n steps to allow a third layer of articles 5 to be transported to the transfer arms 3 (FIG. 1c). During the advance of the conveyor 1 from the position in FIG. 1b to the position of FIG. 1c a further excess article 5b is obtained which is returned in the same manner as the articles 5a and reintroduced into the process at a later stage.

The oblique, dotted arrows in FIGS. 1a to 1d indicate the position of certain articles 5 after advance of the conveyor 1 by n steps.

After the third layer has been transported to the transport arms 3, the conveyor 1 is again advanced by n steps. This cycle is repeated until the required number of layers has been provided.

As it is obvious from a comparison of FIGS. 1c and 1d, once the third layer of articles is provided, each article 5 dropping from the magazine 4 onto the conveyor 1 is advanced to one of the positions 7 in order to be transported by the lifting unit 10 to the respective transport arm 3 and thus no further excess articles are obtained in contrast to the initial stage during which three excess articles 5a,5b have been obtained. These excess articles 5a,5b are collected or returned and reintroduced into the process by a return unit which is generally characterized by reference numeral 40.

The return unit 40 includes a support member in form of an endless conveyor 17 and two idler pulleys 18 in vicinity of each pulley 2. The idler pulleys 18 are provided at a distance to each other close to the circumference of the associated pulley 2 so that the conveyor 17 extends parallel to the conveyor 1 essentially from the deflections about the pulleys 2 along its lower run. In order to provide synchronism between the conveyor 1 and conveyor 17, the latter is guided about the pulleys 2, one of which being the driving pulley. The distance between the conveyors 1 and 17 is such that excess articles 5a,5b are securely held therebetween when being returned from the pulley 2 at the left hand side in FIG. 1 to a position on the conveyor 1 in vicinity of the right hand pulley 2. It is also possible to provide the return unit in form of (not shown) grippers arranged at the conveyor 1 in order to prevent a possible dropping of articles 5 from the left pulley 2. These grippers are actuated such that they pick up the excess articles 5 in vicinity of the left pulley 2 and release them in the area of the right pulley 2.

Since the conveyor 17 runs in synchronism with the conveyor 1, the returned articles 5a,5b are placed onto the conveyor 1 at the correct loading area 16. The supply of articles 5 from the magazine 4 is accordingly interrupted when excess articles are returned onto the conveyor 1. It is important that the one position 16 closest to the transport arms 3 is continously supplied with an article when the conveyor 1 is advanced by a step length s to guarantee a smooth operation and to provide each position 7 with an article when actuating the lifting units 10. Whether the article fed to this forward position 16 is now provided by the magazines 4 of the container 30 or by returning an excess article is irrelevant.

In the event, the articles are intermediate layers, a surplus thereof would not only be obtained during the initial stage but also in case not all intermediate layers provided at the positions 7 are needed e.g. when used in connection with articles of short length. Although not shown in detail, the lifting units 10 are connected to suitable control means which in this case actuate only some lifting units 10.

Turning now to FIG. 2 which illustrates the cooperation between the conveyor 1 and the magazines 4 to allow individual supply of articles 5 from the magazines 4 to the conveyor 1 in a simple manner. Accordingly, the conveyor 1 is a conveying chain consisting of links 19 which have a pitch equal to the step length s. Each link is provided with a pocket 20 whose cross section corresponds to the cross section of each article 5. The conveying chain 1 is advanced at slight play below the magazines 4 so that the articles drop into the pocket 20 under the influence of gravity. The magazines 4 are successively emptied e.g. from right to left. Articles 5a,5b which are returned are still in the respective pocket 20 and thus simply pass below the magazines 4 which in this case would not release further articles 5 as the pockets are already filled. In order to avoid friction and wear, each magazine can be equipped with a not shown control mechanism which regulates the magazines such that always one is used for supply of the conveying chain. The next magazine is released as soon as the magazine previously in operation is empty.

Upon use of several magazines 4 arranged above the conveyor 1, one magazine as soon as being emptied can be substituted by a full one or being recharged so that in the meantime another one assumes the supply of articles without requiring an interruption of the operation of the apparatus. During a magazine change, it is necessary that the one magazine arranged in conveying direction behind the magazine which is about to run out of articles starts the supply as soon as the number of articles in the latter magazine has been reduced to the number of intermediate magazines in order to guarantee that an article 5 is provided at the one loading area 16 closest to the transport arms 3.

Instead of successively supplying the articles onto the conveyor 1, it is also possible to use several magazines simultaneously feeding the conveyor with one complete layer of articles and then have the conveyor advanced by a corresponding number of steps.

A typical transport apparatus has for example seven transport arms with a mutual distance of 1000 mm. In this case, the step length is 166,7 mm in accordance with the formula $s = b/(n-1)$ i.e. $s = 1000 \text{ mm}/(7-1) = 166,7$ mm. Upon a width of e.g. 60 mm for intermediate layers or articles, there is thus space for five magazines within a container width of 800 mm.

The apparatus and the method can be used for conveying articles e.g. intermediate layers, also in reversed direction that is from the transport arms 3 or positions 7 which now serve as loading areas to the magazines 4. This operation would be required when unloading e.g. elongated articles is desired. In this case, the magazines are arranged above the conveying chain and a feeding unit lifts the intermediate layers from the chain and pushes them into the magazine in which they are prevented from dropping by a clamping mechanism. However, it is also possible to arrange the magazines below the lower run of the conveying chain so that the intermediate layers drop into the magazines by opening the gripper in this area.

While the invention has been illustrated and described as embodied in a Method of and Apparatus for Conveying Articles, it is not intended to be limited to the details shown since various modifications and structural changes may be made without departing in any way from the spirit of the present invention.

What is claimed as new and desired to be protected by Letters Patent is set forth in the appended claims:

1. Apparatus for conveying articles from at least one loading area to a plurality of depositing areas; comprising:
   at least one magazine containing the articles;
   a conveyor cooperating with said container for transporting the articles in conveying direction from said loading area to a plurality of predeterminged positions in correspondence with the number of depositing areas; and
   lifting means arranged at each of said positions for elevating the articles from said positions to said depositing areas, said conveyor being advanced step-by-step at a step length $s=b/(n-1)$ wherein b is the distance between two adjacent positions and n is the number of said positions, said magazine being spaced from the one of said positions closest in conveying direction at a distance $a=s\cdot x$ wherein x is an integer.

2. Apparatus as defined in claim 1 wherein each of said lifting means includes a cylinder extending perpendicular to said conveyor, a piston reciprocating within said cylinder, a piston rod having one end connected to said piston and another end, and an engaging member connected to said other end of said piston rod and facing the respective one of said positions so that upon actuation of said piston, said engaging member is lifted to pick up the article resting on said respective position and to place it on the respective one of said depositing areas.

3. Apparatus as defined in claim 2 wherein said conveyor is provided with adjoining openings to allow said engaging members to move therethrough when picking up the articles.

4. Apparatus as defined in claim 2 wherein said cylinder defines a vertical axis, and further comprising tilting means for pivoting said cylinders at an angle $\alpha$ with respect to said vertical axis about a pivot arranged at the lower end of said cylinder so that said engaging member is moved laterally past and beyond said depositing area to allow depositing of the article on said area when retracting to its lower position.

5. Apparatus as defined in claim 4 wherein said tilting means includes a cylinder extending perpendicular to said cylinders of said lifting means, a piston reciprocating in said cylinder and a horizontal rod cooperating with said piston and connected to said cylinders of said lifting means at a vertical distance to said pivots so that upon actuation of said horizontal rod said cylinders of said lifting means are tilted about said angle $\alpha$.

6. Apparatus as defined in claim 4 wherein said conveyor is a conveying chain provided with open links, said engaging members being movable through said openings of said links.

7. Apparatus as defined in claim 6 wherein said conveying chain has a pitch corresponding to said step length.

8. Apparatus as defined in claim 6 wherein each of said links has a pocket for receiving one article released from said magazine.

9. Apparatus as defined in claim 1, and further comprising return means for transporting excess articles back to said loading area.

10. Apparatus as defined in claim 9, and further comprising two pulleys about which said conveyor extends, said return means including an endless support member running in synchronism with said conveyor and extending parallel to said conveyor at said pulleys and along the lower run of said conveyor.

11. Apparatus as defined in claim 1 wherein a plurality of said magazine is arranged side-by-side in conveying direction, said magazines having a distance from each other corresponding to the step length s.

12. The use of an apparatus as defined in claim 1 for conveying intermediate layers to a transport unit for elongated articles.

13. A method for conveying articles from at least one loading area to a plurality of depositing areas; comprising the steps of:
   advancing a conveyor step-by-step in conveying direction;
   placing the articles onto the conveyor between two succeeding steps on said loading area and transporting them to predetermined positions;
   removing between two sequences of n steps at least one article from its respective position wherein n is the number of predetermined positions, each step length s by which the conveyor is advanced being calculated in accordance with the formula $s=b/(n-1)$ wherein b is the distance between succeeding positions and n is the number of positions, and
   spacing the loading area from the position closest in conveying direction at a distance $a=s\cdot x$ wherein x is an integer.

14. A method as defined in claim 13, and further comprising the step of initially advancing the conveyor by $(n-1)^2+x$ steps to allow all positions to be provided with one article before said removing step.

15. A method as defined in claim 13, and further comprising returning excess articles to the loading position.

16. A method as defined in claim 13 wherein a plurality of loading areas are provided spaced from each other at a distance of the step length s, and further comprising consecutively feeding articles to the loading areas and arranging between two successive steps one article on the respective one of said loading areas.

17. A method as defined in claim 13 wherein a plurality of loading areas are provided spaced from each other at a distance of the step length s, and further comprising simultaneously feeding at least two of the loading areas with one article and advancing the conveyor by a number of steps corresponding to the number of supplied loading areas.

18. A method as defined in claim 13 for supplying intermediate layers to a transport unit for elongated articles.

* * * * *